(12) United States Patent
Lance et al.

(10) Patent No.: US 9,220,981 B2
(45) Date of Patent: Dec. 29, 2015

(54) CONTROLLING ATTRIBUTE EXPRESSION WITHIN A VIRTUAL ENVIRONMENT

(75) Inventors: John M. Lance, Littleton, MA (US); Josef Scherpa, Fort Collins, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1910 days.

(21) Appl. No.: 12/346,344

(22) Filed: Dec. 30, 2008

(65) Prior Publication Data
US 2010/0169800 A1 Jul. 1, 2010

(51) Int. Cl.
 *G06F 3/048* (2013.01)
 *A63F 13/30* (2014.01)
 *G06N 3/00* (2006.01)

(52) U.S. Cl.
 CPC ............ *A63F 13/12* (2013.01); *A63F 2300/556* (2013.01); *A63F 2300/5553* (2013.01); *G06N 3/006* (2013.01)

(58) Field of Classification Search
 CPC .................. A63F 2300/5553; A63F 2300/556; A63F 13/00
 USPC ..................... 715/757, 751, 753, 758, 706
 See application file for complete search history.

(56) References Cited

U.S. PATENT DOCUMENTS

| | | | |
|---|---|---|---|
| 8,108,774 B2* | 1/2012 | Finn | A63F 13/12 715/706 |
| 8,347,217 B2* | 1/2013 | Brillhart | A63F 13/12 715/745 |
| 8,924,250 B2* | 12/2014 | Bates | G06Q 30/02 705/14.4 |
| 2004/0179037 A1 | 9/2004 | Blattner et al. | |
| 2004/0179038 A1* | 9/2004 | Blattner et al. | 345/751 |
| 2007/0061730 A1* | 3/2007 | O'Mahony et al. | 715/751 |
| 2007/0188502 A1 | 8/2007 | Bishop | |
| 2008/0026839 A1* | 1/2008 | Alringer | 463/31 |
| 2008/0201638 A1 | 8/2008 | Nair | |
| 2009/0037822 A1* | 2/2009 | Kandekar et al. | 715/733 |
| 2009/0254859 A1* | 10/2009 | Arrasvuori et al. | 715/810 |
| 2009/0312080 A1* | 12/2009 | Hamilton et al. | 463/1 |
| 2009/0319895 A1* | 12/2009 | Kinsella et al. | 715/706 |
| 2010/0169798 A1* | 7/2010 | Hyndman et al. | 715/757 |

* cited by examiner

*Primary Examiner* — Dino Kujundzic
(74) *Attorney, Agent, or Firm* — Cuenot, Forsythe & Kim, LLC

(57) ABSTRACT

A computer-implemented method of controlling attribute expression for an avatar within a virtual environment can include defining a rule that determines expression of an attribute of a first avatar conditioned upon an attribute of at least one other avatar within a virtual environment and, responsive to the first avatar contacting a second avatar within the virtual environment, determining an attribute of the second avatar. The method can include determining whether to express the attribute of the first avatar according to the attribute of the second avatar as determined by the rule and outputting a state of the first avatar specifying each attribute selected for expression.

7 Claims, 6 Drawing Sheets

CONTROLLING ATTRIBUTE EXPRESSION WITHIN A VIRTUAL ENVIRONMENT

BACKGROUND

The embodiments of the present invention relate to controlling attribute expression for a user and/or avatar within a virtual environment. A virtual environment refers to a computer-based, simulated environment intended to allow one or more users to interact with one another within simulated real world or fantasy locations. Within virtual environments, users can represent themselves using a visual character called an "avatar." A user typically selects an avatar to represent or convey some characteristic that the user wishes to express or expose to others within the virtual environment. For example, an avatar for a teenage user within a virtual environment may carry a skateboard to reflect the lifestyle of that user. As such, an avatar serves as an onscreen persona for the user.

Typically, a user accesses a virtual environment through a client computing system that interacts with a remote server. The remote server can provide a variety of geographically separate users with a communal space, e.g., the virtual environment, in which to interact with each other embodied as avatars. Each user, as represented by his or her avatar within the virtual environment, can move about within the virtual environment, interact with other avatars, e.g. users, as well as graphical objects within the virtual environment.

BRIEF SUMMARY OF THE INVENTION

The embodiments disclosed herein relate to controlling expression of attributes for a user and/or avatar within a virtual environment. One embodiment of the present invention can include a computer-implemented method of attribute expression for an avatar within a virtual environment. The method can include defining a rule that determines expression of an attribute of a first avatar conditioned upon an attribute of at least one other avatar within a virtual environment and, responsive to the first avatar contacting a second avatar within the virtual environment, determining an attribute of the second avatar. The method can include determining whether to express the attribute of the first avatar according to the attribute of the second avatar as determined by the rule and outputting a state of the first avatar specifying each attribute selected for expression.

Another embodiment of the present invention can include a system that controls expression of attributes. The system can include a memory storing computer-usable program code that, when executed, controls attribute expression in association with an avatar within a virtual environment. The system also can include a processor executing the computer-usable program code. The processor can define a rule that determines expression of an attribute of a first avatar conditioned upon an attribute of at least one other avatar within a virtual environment and, responsive to the first avatar contacting a second avatar within the virtual environment, determine an attribute of the second avatar. The processor further can determine whether to express the attribute of the first avatar according to the attribute of the second avatar as determined by the rule and output a state of the first avatar comprising each attribute selected for expression.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
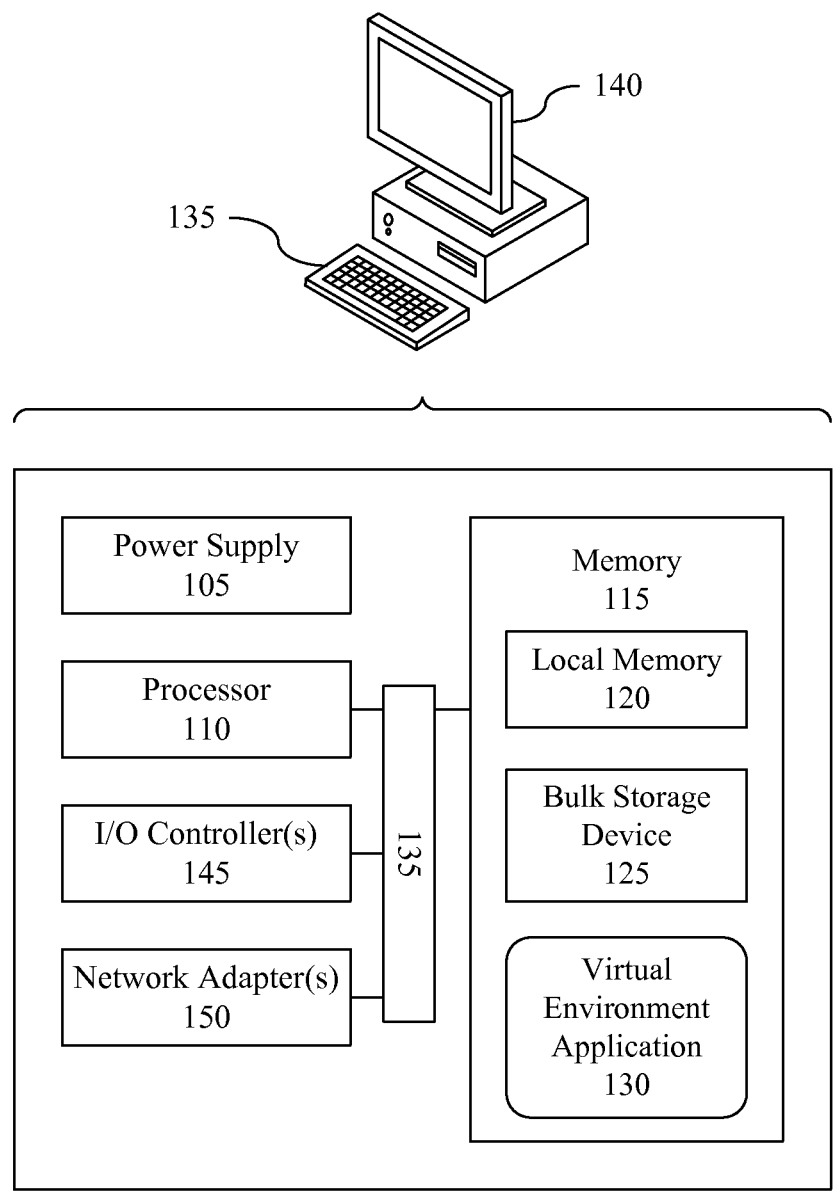
FIG. 1 is a block diagram illustrating a system for controlling attribute expression for a user within a virtual environment in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein relate to controlling the presentation of attributes associated with a user within a virtual environment. Within this specification, the term "virtual environment," can refer to any environment within which a user can be represented as an avatar. For example, a virtual environment can include a virtual world in which a first user, as represented by an avatar, can interact with one or more other users also represented as avatars. In another example, a virtual environment can include a messaging or chat session where the avatar of each user engaged in the chat session can be presented to each other user engaged in the chat session. In still another example, a virtual environment can include a social networking type of Web site where a user can present an avatar to those users that may visit the Web site or page of that user.

In accordance with the inventive arrangements disclosed herein, a user within a virtual environment can define rules which can determine which attributes will be presented to other users within that virtual environment. The rules that are specified can control the presentation of attributes for a particular user, e.g., a first user, based upon the attributes for one or more other users encountered by the first user within the virtual environment. In this manner, the appearance of the avatar of the first user can be changed or modified when presented to any other user within the virtual environment that is able to view the avatar of the first user.

FIG. 1 is a block diagram illustrating a system 100 for controlling attribute expression for a user within a virtual environment in accordance with one embodiment of the present invention. System 100 can be implemented as a data processing system, e.g., a computer, that can execute computer-usable program code. Accordingly, system 100 can include a power supply 105 providing power to the various components of system 100. System 100 further can include at least one processor 110 coupled directly or indirectly to memory elements denoted as memory 115 through a system bus 135. Memory 115 can include one or more physical memory devices or elements. The elements can include, for example, local memory 120 employed during actual execution of the program code, e.g., random access memory (RAM), one or more bulk storage devices 125, e.g., a "hard disk drive" or other persistent data storage device, and cache memories (not shown) which provide temporary storage of at least some program code in order to reduce the number of times code must be retrieved from bulk storage during execution.

Input/output (I/O) devices such as a keyboard 135, a display 140, and a pointing device (not shown) optionally can be coupled to system 100 as well as one or more other I/O devices. The I/O devices can be coupled to system 100 either directly or through one or more intervening I/O controllers 145. One or more network adapters 150 also can be coupled to system 100 through system bus 135 to enable system 100 to become coupled to other data processing systems or remote printers or storage devices through intervening private or public networks. Modems, cable modems, and Ethernet cards are just a few of the currently available types of network adapters 150.

As shown, memory 115 can include a virtual environment application (VEA) 130, which can be executed by processor 110. Processor 110, executing VEA 130, can perform a variety of functions such as defining one or more rules that present attribute(s) of an avatar representing a first user conditioned upon an attribute of at least one other user within the virtual environment. Processor 110 can determine attributes of one or more other users encountered by the first user. Processor 110 also can determine whether to present and/or modify the attribute(s) of the first user according to the attribute(s) of the other encountered users as determined by the rule(s). A state of the avatar of the first user, which defines each attribute of the first user that is selected for presentation to the other users, can be output. As used herein, "output" or "outputting" can include, but is not limited to, storing data in memory, e.g., writing to a file, writing to a user display or other output device, e.g., playing audible notifications, sending or transmitting to another system, exporting, or the like.

In one embodiment, system 100 can be implemented as a client system for a user. In that case, VEA 130 can be client-side program executed by processor 110 that is associated with a particular user and avatar of that user. In another embodiment, system 100 can be implemented as a server, where VEA 130 is a server-side program that communicates with one or more clients executing client-side VEA software. In any case, the various functions and decisions described within this specification will largely be described as taking place within the clients. It should be appreciated, however, that the clients can be configured to provide information to a server, where one or more or all of the various functions described within this specification can be made and then output to the respective clients.

Figure 2:
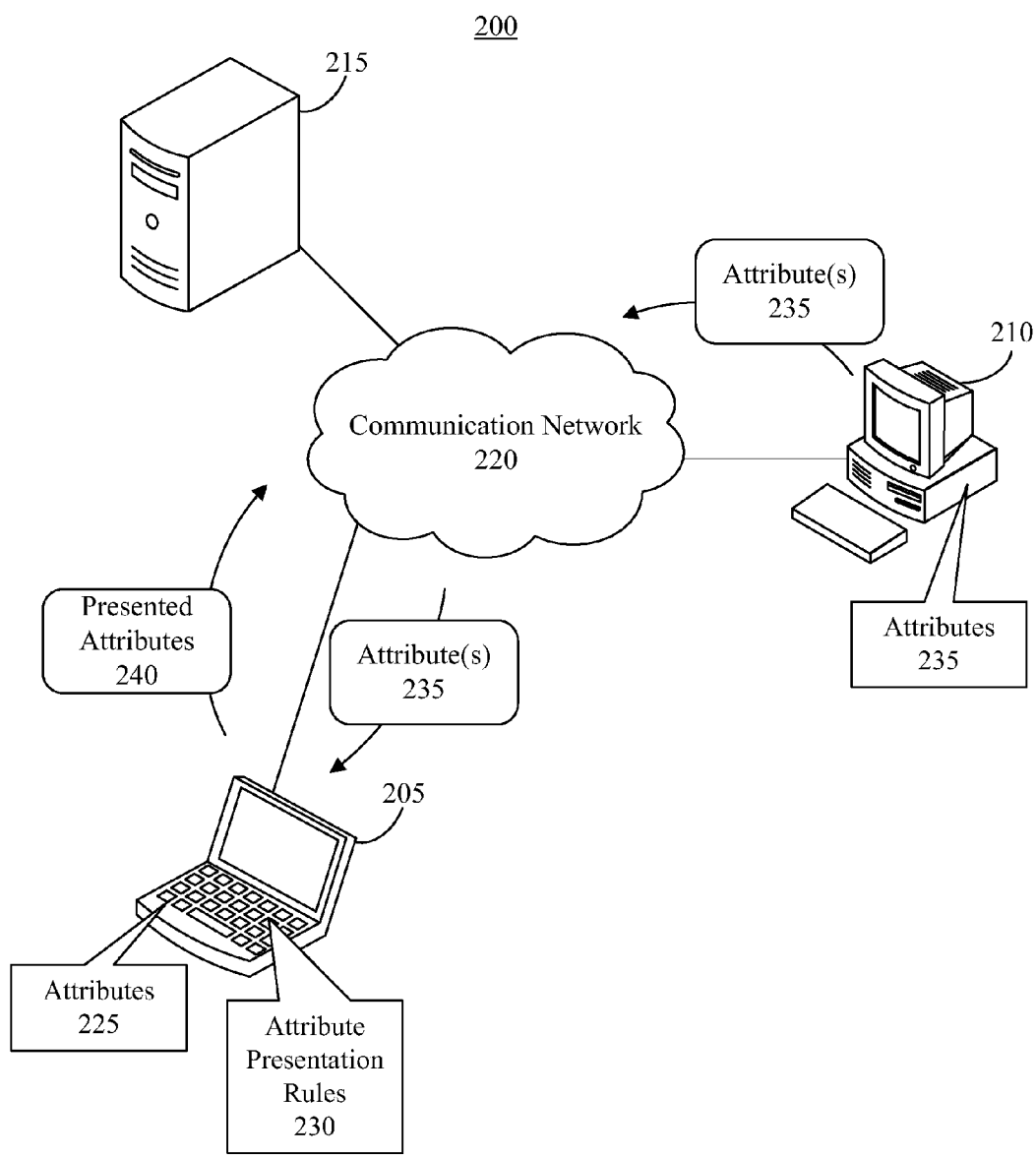
FIG. 2 is a block diagram illustrating a system for controlling attribute expression for a user within a virtual environment in accordance with another embodiment of the present invention.

FIG. 2 is a block diagram illustrating a system 200 for controlling attribute expression for a user within a virtual environment in accordance with another embodiment of the present invention. System 200 can include a plurality of virtual environment clients (client) 205 and 210 and a virtual environment server (server) 225. Clients 205 and 210 and server 215 can be communicatively linked through communication network 220.

Communication network 220 can be implemented as, or include, without limitation, a WAN, a LAN, the Public Switched Telephone Network (PSTN), the Web, the Internet, and one or more intranets. Communication network 220 further can be implemented as or include one or more wireless networks, whether short or long range, and/or mobile.

Each of clients 205 and 210 and server 215 can be implemented as a computer as described with reference to FIG. 1. Clients 205 and 210 can execute a suitable client-side VEA, whereas server 215 can execute a suitable server-side VEA. For example, server 215 can provide a virtual world type of virtual environment through which users of clients 205 and 210 can interact during the course of a virtual world session. In another example, server 215 can support chat sessions that clients 205 and 210 can join and take part. Within this specification, the term "client," "user," and "avatar" may be used interchangeably from time to time. It should be appreciated that as a user interacts with a virtual environment through a client, e.g., client 205 or client 210, any communications or data to be provided to the user will be provided to the client. Further, the client will be represented within the virtual environment as an avatar, e.g., the avatar is a proxy of the user. In this sense, reference to a particular avatar or client will also refer to the user corresponding to the referenced client and the avatar that represents the user.

As shown, client 205 can include one or more attributes 225. In general, attributes can be exposed to other users or hidden. Each attribute can dictate, for example, the appearance of an avatar corresponding to the user, e.g., the user of client 205 in this case. Client 205 further can include one or more attribute presentation rules 230. Attribute presentation rules 230 can define how attributes are to be expressed. For example, attribute presentation rules 230 can dictate which attributes of client 205 will be presented to another user that encounters client 205 within the virtual environment and/or whether such attributes will be changed. The attribute presentation rules 230 can be conditioned upon the attributes of the users with whom client 205 can encounter. For example, attribute presentation rules can specify which of attributes 225 of client 205 will be presented, whether such attributes will be modified, etc., based upon the attributes specified for the user of client 210, when client 210 comes in contact with client 205 within the virtual environment. Accordingly, "expression" of an attribute can refer to the selective presentation or display of that attribute, the modification of that attribute, the suppression of that attribute, and the addition of an attribute not previously associated with an avatar and/or a user.

As used within this specification, the term "contact" or "encounter," within a virtual world type of virtual environment, can refer the situation in which an avatar of client 205 is within a predetermined distance of an avatar of client 210 within the virtual world. The contact can occur during a virtual world session in which both users are logged into the virtual world concurrently. Contact also can refer to the avatars of clients 205 and 210 being within a same defined geographic region within the virtual environment, being involved in a collaboration or communication within the virtual environment, or any other activity within a virtual environment involving two or more users exchanging attributes such as avatar display information while interacting within the virtual environment.

In the context of a chat session that exists independently of a virtual world type of virtual environment, contact or an encounter can refer client 205 and client 210 being engaged in a chat session with one another. In the context of a social networking system or Web site that is separate or independent of a virtual world type of virtual environment, contact or an encounter can refer to a client 210 visiting the site or online location of client 205.

In any case, when one user is in contact with another user, the particular attributes exposed by each user can vary according to the attributes of the other user, e.g., the values of those attributes, whether those attributes are exposed, or the like. Thus, as shown in FIG. 1, when client 205 encounters client 210 within a virtual environment, one or more of attributes 235 of client 210 can be sent via communication network 220 to client 205.

Client 205 can evaluate attributes 235 according to attribute presentation rules 230. Client 205 can select which of attributes to present to client 210, the value of those attributes, and other aspects of the attributes to be described within this specification. The attributes, and values, selected for expression can be sent to client 210 in the form of expressed attributes 240. Expressed attributes 240 can be one or more of attributes 225, a subset of attributes 225, or a modified version of one or more of the attributes 225. In another example, additional attributes not originally defined within attributes 225 can be specified and included within expressed attributes 240.

Expressed attributes 240 can define a state of the user of client 205, or the avatar thereof. As noted, that state can specify the way in which other users will view the avatar corresponding to client 205, e.g., the expression of the attributes of the avatar for client 205. In one aspect, attributes can be presented in the form of text, e.g., a listing of attributes that can be displayed to other users when those users encounter the user of client 205. For example, the expressed attributes 240 can be displayed by client 210 as a list. In another aspect, the attributes that are presented, when interpreted by either server 215 or another client such as client 210, will cause the avatar corresponding to user 205 to be changed or modified in a way that corresponds to the state of the avatar defined by the expressed attributes 240. The visualization of the avatar corresponding to the user of client 205 can be displayed within client 210 in that changed form based upon the expressed attributes 240 that are received by client 210.

As noted, in another embodiment, the attribute presentation rules 230 as well as attributes for the various users involved in the virtual environment can be stored within server 215. In that case, the application of the attribute presentation rules for each respective user can be applied or processed within server 215. In that case, server 215 can output instructions that can be interpreted by each respective client that dictate how each avatar is to be displayed.

In cases where the user of client 205 contacts two or more other users concurrently within a virtual environment, the expressed attributes 240 that are sent to each of the contacted users may vary according to the attributes of each respective contacted user. As each contacted user, and thus avatar, may have a differing set of attributes, the appearance of the avatar for the user of client 205, as displayed to each respective user that is encountered, will vary from user to user. That is, the appearance of the avatar of client 205 will appear one way to the user of client 210 and another way to a third user, for example.

Figure 3:
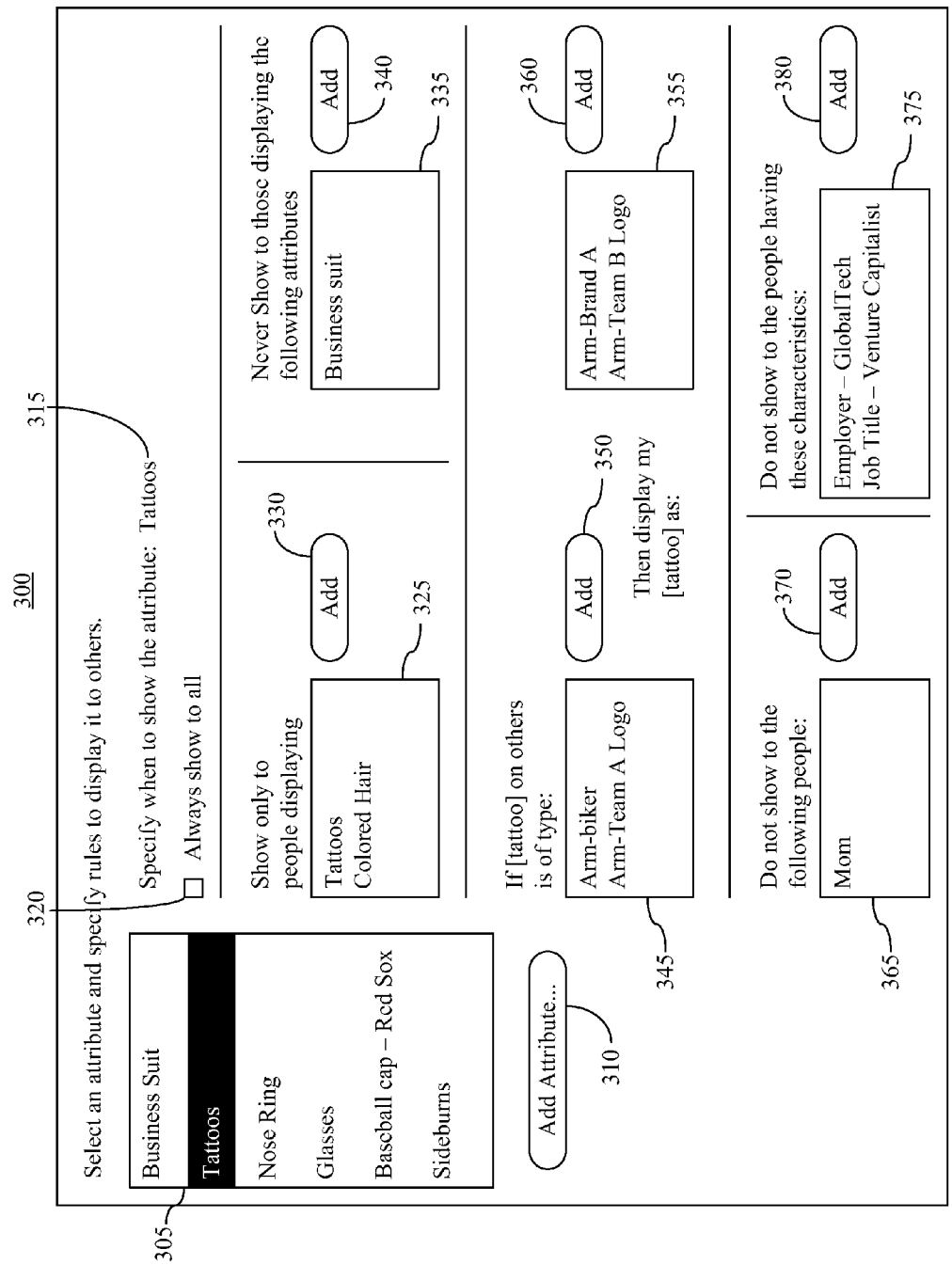
FIG. 3 is a view of a graphical user interface (GUI) through which a user can specify rules that control attribute expression for a user within a virtual environment in accordance with another embodiment of the present invention.

FIG. 3 is a view of a graphical user interface (GUI) 300 through which a user can specify rules that control attribute expression for a user within a virtual environment in accordance with another embodiment of the present invention. GUI 300 can be displayed by a system as described with reference to FIGS. 1 and/or 2. GUI 300 can include a plurality of different visual controls through which users can specify rules, e.g., attribute presentation rules, to be applied to determine attribute presentation within a virtual environment. Interpretation of the rules specified through GUI 300, when a first user encounters another user within a virtual environment will cause the system of the first user to output expressed attributes as illustrated within FIG. 2.

Field 305 can present a list of attributes that have been associated with an avatar of a first user within the virtual environment. The attributes influence or control the visual presentation of the avatar associated with the first user within the virtual environment. In this example, the attribute "Tattoos" has been selected by the first user. The context of the remainder of the controls of GUI 300 can be changed to reflect the rules or actions specified for the selected attribute as indicated by text 315. That is, selection of different controls within GUI 300 will only apply to the particular attribute that is selected in field 305. Activation of button 310 can cause the system to present an interface through which the first user can navigate to select a particular attribute that is associated with the first user and, thus, the avatar of the first user, to be added to the field 305. Inclusion of an attribute within field 305 allows the first user to specify one or more rules for that attribute.

Selection of check box 320 will cause the system to always display the attribute highlighted in field 305 under any circumstances regardless of the attributes that may be possessed by another avatar that is encountered by the avatar of the first user within the virtual environment. More particularly, the attribute will always be indicated visually with regard to the avatar of the first user despite the particular attributes of avatars contacted by the first user within the virtual environment.

Field 325 allows the first user to specify attributes that must be displayed by encountered users in order to display the selected attribute on the avatar of the first user. If an encountered user is displaying the attributes specified in field 325, e.g., those attributes are not hidden, the tattoo on the avatar of the first user will be displayed. Otherwise, the attribute of the first user is not displayed upon the avatar of the first user. In this example, the tattoo on the avatar of the first user will only be displayed when another encountered avatar has a tattoo or has colored hair. Selection of button 330 causes the system to present an interface allowing the first user to navigate to a desired attribute that can be added the list of attributes specified within field 325.

Field 335 allows the first user to specify attributes that, if possessed by an encountered avatar, will cause the system to suppress, e.g., not display, the attribute selected in field 305. In this example, if the avatar of an encountered user is wearing a business suit, the tattoo of the avatar of the first user will be suppressed, e.g., not displayed or covered by a piece of clothing. Selection of button 340 causes the system to present a user interface through which the first user can select another attribute to be added to field 335.

Field 345 can receive a specific variation for one or more attributes that, if displayed by another avatar encountered by the avatar of the first user, will cause the variation, e.g., the type, of the attribute selected in field 305 to be changed or modified. The "variation" of an attribute, as used within this specification, can refer to a sub-category of the attribute. For example, if an attribute is "Tattoo," a variation of the attribute can be "Arm," "Leg," "Ankle," or the like in reference to the placement or location of the tattoo on one's avatar. Further sub-categories can be specified such as the particular picture for the tattoo, e.g., the logo of a professional sports franchise or motorcycle brand. Selection of button 350 causes the system to present a user interface through which the first user can select another attribute and variation of that attribute to be added to field 345.

Within field 355, the first user can specify the particular modification of the attributes to be made and presented responsive to detecting the corresponding attribute variations listed in field 345. In this example, if a contacted user has a tattoo of variation "Arm-biker," then the tattoo of the first user can be changed to a variation that is displayed as a picture of a particular brand of motorcycle, e.g., Brand A. If the tattoo of another avatar encountered by the avatar of the first user within the virtual environment is for a particular sports franchise, e.g., "Team A," then the tattoo of the first user can be changed to that of a different sports franchise, e.g., "Team B." This allows one take on an antagonistic posture or a supportive posture with regard to other avatars that may be encountered. Selection of button 360 causes the system to present a user interface through which the first user can select another attribute modification, e.g., a specific variation, to be added to field 355.

Field 365 can receive one or more persons, e.g., identities, that, if contacted within the virtual environment, will cause the suppression of the attribute selected in field 305. In this example, when the first user comes in contact with his or her "Mom" within the virtual environment, the tattoos of the avatar of the first user can be suppressed, or not shown. Selection of button 370 causes the system to present a user interface through which the first user can select another attribute to be added to field 365.

Field 375 can receive one or more attributes, or particular variations of attributes, that if possessed by another avatar encountered by the avatar of the first user will cause the attribute selected in field 305 to be suppressed, e.g., not displayed upon or in association with the avatar of the first user. In this example, the first user has specified that if another avatar is encountered that has an attribute indicating that the encountered avatar is employed by "GlobalTech," the tattoo of the avatar of the first user is not to be displayed. Similarly, if the job title attribute of an avatar that is encountered by the avatar of the first user is "Venture Capitalist," the tattoo of the first user is not to be displayed. Selection of button 380 causes the system to present a user interface through which the first user can select another attribute to be added to field 375.

Though a remove button is not illustrated with regard to the various fields of GUI 300, it should be appreciated that one may be included as a companion to each of the add buttons. Further, a user can select any attribute within one of the fields and press the delete key or issue a delete command causing the system to remove the selected attribute from the field.

FIG. 3 is presented as an example of one way in which attribute presentation rules can be specified to control the presentation or expression of an attribute in connection with the avatar of a user. As noted, each rule can be conditioned upon some attribute of another user, e.g., avatar, that is encountered by the first user within the virtual environment. GUI 300 illustrates various types of rules, e.g., always show, never show, show under specified conditions, or change an attribute under specified conditions.

In another embodiment, GUI 300 can include a priority section that allows the first user to specify priorities among various attributes. A priority can be used in any of a variety of different ways to selectively determine which attributes to present or display, particularly when a conflict exists. As an example, consider the case where two avatars encounter one another within a virtual environment and the rules require more than one attribute to be displayed. For instance, the rules can require the first avatar to display an arm tattoo and also a team sweatshirt. In this case, the arm-tattoo will not be visible beneath the team sweatshirt. Priorities associated with the attributes can be used to select the attribute having the highest priority as the attribute to be displayed. The attribute with the lesser priority will not be displayed. Thus, if the arm tattoo has a higher priority than the team sweatshirt, the arm tattoo is displayed and the team sweatshirt is not. If the team sweatshirt has a higher priority than the arm tattoo, the team sweatshirt can be displayed and the arm tattoo is not.

In another example, the priorities can be used to specify the view of a user's avatar as presented to himself or herself, e.g., through his or her own client. Consider the case where an avatar for the first user is shown differently to each of a plurality of other users. The priorities established for attributes can be one way in which a preferred view can be selected for displaying the avatar to the first user represented by that avatar. In any case, the client of the first user can indicate which attributes are being presented to each of the plurality of other users in contact with the avatar of the first user.

Figure 4:
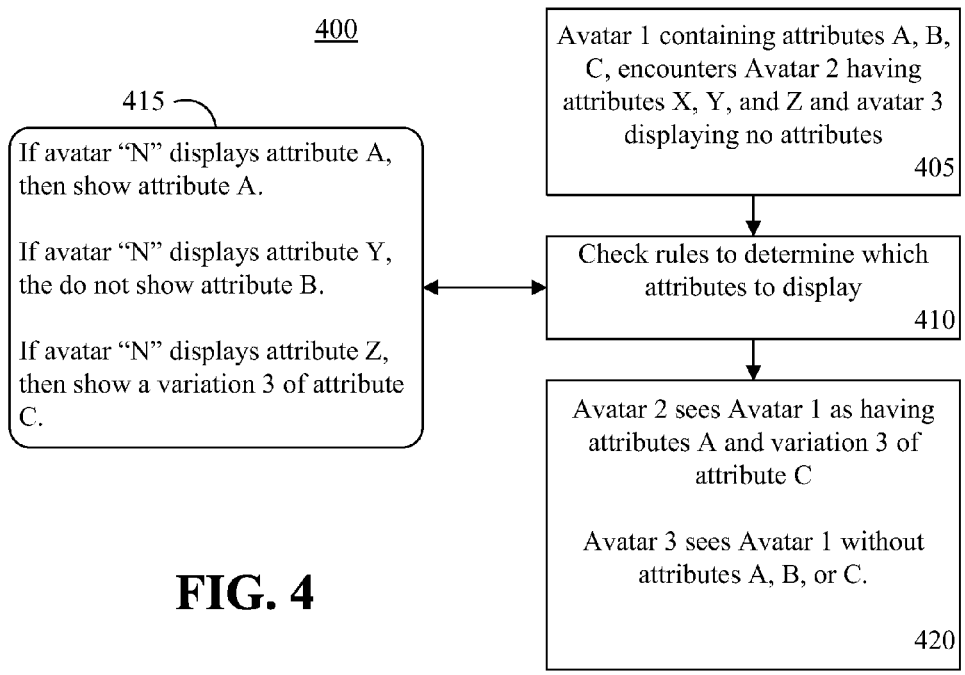
FIG. 4 is a block flow diagram illustrating a method of controlling attribute expression for a user within a virtual environment in accordance with another embodiment of the present invention.

FIG. 4 is a block flow diagram illustrating a method 400 of controlling attribute expression for a user within a virtual environment in accordance with another embodiment of the present invention. FIG. 4 illustrates an example where a first user represented by Avatar 1 comes in contact with a second user represented by Avatar 2 and a third user represented by Avatar 3 within a virtual environment. As illustrated in block 405, Avatar 1 can have attributes of A, B, and C. Avatar 1 can encounter Avatar 2 having attributes of X, Y, and Z. Avatar 1 also can come in contact with Avatar 3 concurrently with Avatar 2. Avatar 3 can have no attributes.

In block 410, the system can check rules to determine which attributes of Avatar 1 to display to the users corresponding to Avatars 2 and 3. Accordingly, the system can check the rules specified for Avatar 1. Block 415, which specifies rules that control the presentation of Avatar 1 to other users, indicates that if another avatar, denoted as avatar "N" displays attribute A, then Avatar 1 will display attribute A. If another avatar "N" displays attribute Y, then Avatar 1 will not display or show attribute B. If avatar "N" displays attribute Z, then Avatar 1 will show a third variation, e.g., type, of attribute C. Accordingly, block 420 indicates that the user represented by Avatar 2 sees Avatar 1 as having attributes A and variation 3 of attribute C. Avatar 3 sees Avatar 1 without attributes A, B, or C.

Figure 5:
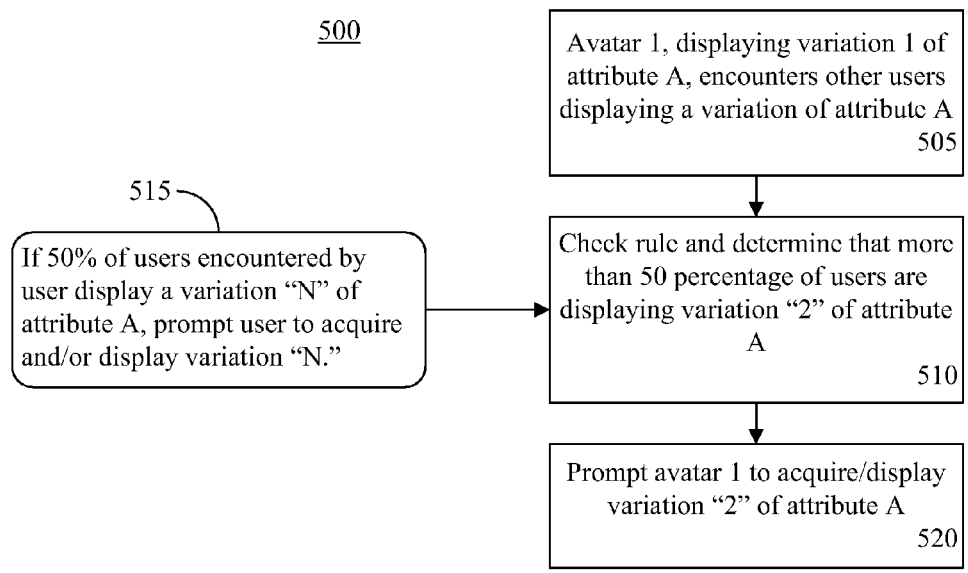
FIG. 5 is a block flow diagram illustrating a method of controlling attribute expression for a user within a virtual environment in accordance with another embodiment of the present invention.

FIG. 5 is a block flow diagram illustrating a method 500 of controlling attribute expression for a user within a virtual environment in accordance with another embodiment of the present invention. FIG. 5 illustrates an example where the variation of an attribute for a user can be changed according to the particular variation of the same attribute possessed by one or more encountered users.

As illustrated in block 505, Avatar 1 can display variation 1 of attribute A. Avatar 1 can encounter other users displaying a variation of attribute A other than variation 1. For example, attribute A can indicate that Avatar 1 is wearing a baseball hat. The variation can indicate that a particular logo of a sports franchise is shown on the hat worn by Avatar 1. In block 510, the system can check the rule for the user represented by Avatar 1. Block 515 indicates that the system specifies a rule for Avatar 1 which states that if more than some threshold percentage of users, e.g., 50%, of users encountered by the user corresponding to Avatar 1 display variation "N" of attribute A, prompt the user whether he or she would like to acquire or display variation "N" of attribute A. Referring back to block 510, the system can determine that more than 50% of the avatars encountered by Avatar 1 are displaying variation 2 of attribute A.

Accordingly, in block 520, the system can prompt the user of Avatar 1 whether he or she would like to acquire and/or display variation 2 of attribute A. For example, if Avatar 1 is within a baseball stadium and wearing a baseball hat bearing the logo of the sports franchise corresponding to variation 1 of attribute A while more than 50% of the other avatars also present in the baseball stadium display variation 2 of attribute A corresponding to a logo for a different sports franchise, the user can be asked whether he or she would rather display variation 2 of attribute A. Depending upon the answer provided by the user of Avatar 1, the variation of attribute A can be changed. In this example, encountered users can be those users represented by avatars in attendance, e.g., within the stadium, of the baseball game.

Figure 6:
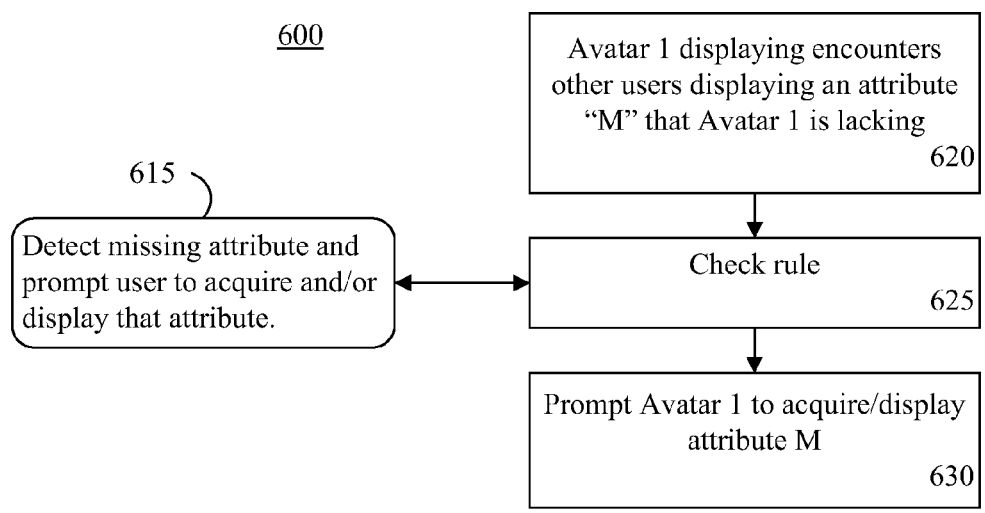
FIG. 6 is a block flow diagram illustrating a method of controlling attribute expression for a user within a virtual environment in accordance with another embodiment of the present invention.

FIG. 6 is a block flow diagram illustrating a method 600 of controlling attribute expression for a user within a virtual environment in accordance with another embodiment of the present invention. FIG. 6 illustrates an example where Avatar 1 encounters another avatar that displays attribute "M" that is not possessed by Avatar 1. For example, Avatar 1 can be attending a baseball game. Attribute "M," possessed or displayed by other avatars attending the baseball game, can indicate that such avatars have team banners.

Step 625 indicates that the system consults the rule specified in block 615 for Avatar 1, which states that if an attribute is missing from the user, prompt the user whether to acquire and/or display that attribute. In this example, Avatar 1 does not have an attribute "M," and thus does not have a team banner. If, for example, more than a predetermined percentage, or number, of the other avatars also attending the baseball game have team banners, e.g., have attribute "M," the system can prompt, in block 630, the user of Avatar 1 whether to acquire and/or display attribute "M," e.g., display a team banner. If the user of Avatar 1 answers affirmatively, Avatar 1 can be displayed with a team banner. If the user of Avatar 1 answers in the negative, Avatar 1 can be displayed without the team banner.

Another example of the application of the attribute expression rules can relate to a process where each user submits to a type of "joint disclosure" with respect to attributes. In illustration, consider the case where Avatar 1 has attribute A, which is set to "hidden" mode. Attribute A is not displayed by Avatar 1. Avatar 2 can have attribute A, which also can be set to "hidden" so that attribute B is not displayed by Avatar 2. Avatar 1 can be associated with an attribute expression rule that states that hidden attributes are only to be displayed when Avatar 1 encounters another avatar that also possesses the attribute, whether that attribute is displayed or hidden. The rule may also be defined on a global level, e.g., in the server, such that the rule applies to all avatars, not to a particular avatar such as Avatar 1. In any case, when Avatar 1 encounters Avatar 2 within the virtual world, Avatar 1 will display attribute A since Avatar 2 also possesses attribute A. If the rule is global, or a like rule is defined for Avatar 2, then Avatar 2, upon encountering Avatar 1, will also display attribute A.

Figure 7:
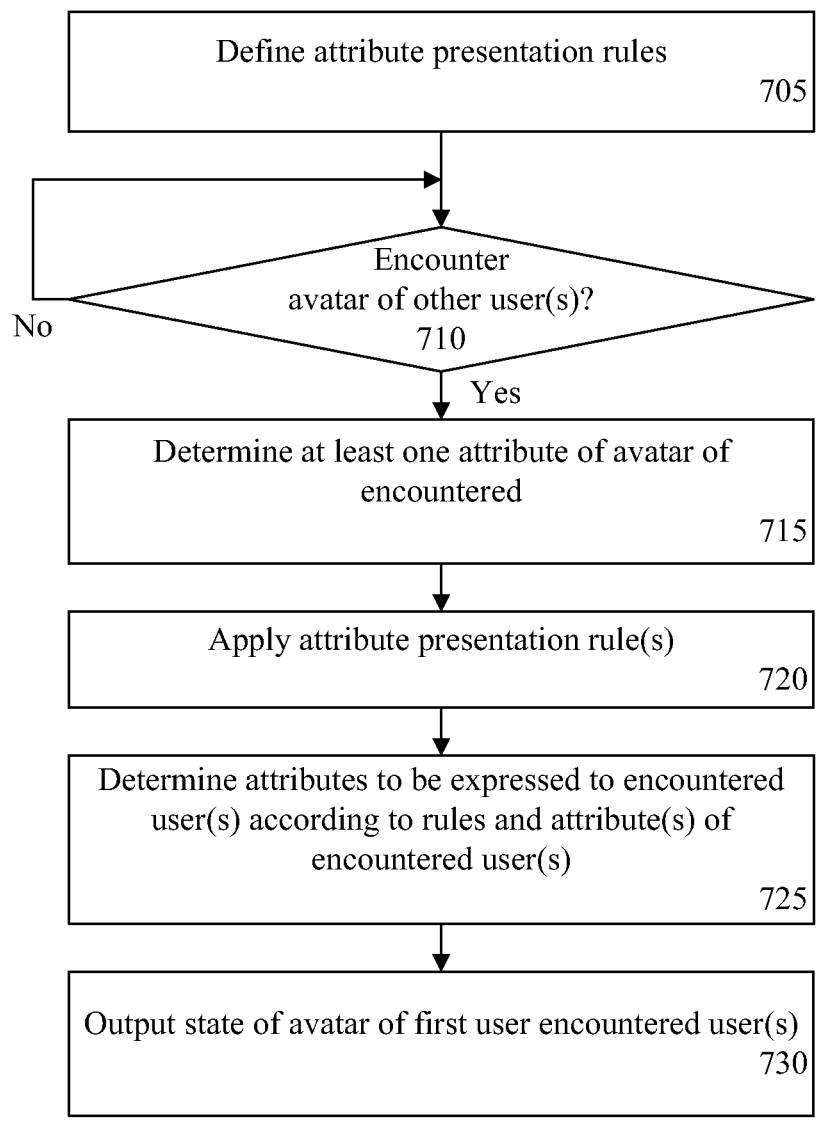
FIG. 7 is a flow chart illustrating a method of controlling attribute expression for a user within a virtual environment in accordance with another embodiment of the present invention.

FIG. 7 is a flow chart illustrating a method 700 of controlling attribute expression for a user within a virtual environment in accordance with another embodiment of the present invention. Method 700 can be implemented using a system as described with reference to FIGS. 1-6. Accordingly, method 700 can begin in step 705 where one or more attribute presentation rules for a user, e.g., a first user, can be defined.

In step 710, the system can determined whether the user has encountered another user within the virtual environment. More particularly, the system can determine whether the avatar of the first user has encountered an avatar of at least one other user within the virtual environment. If one or more avatars of other users are encountered, the method 700 can continue to step 715. Otherwise, the method 700 can loop back to step 710 to continue monitoring for other avatars that may be encountered by the avatar of the first user within the virtual environment. In step 715, the system can determine any attributes of the encountered users that are displayed or otherwise made available.

In step 720, the system can apply the rules defined for the first user. Accordingly, in step 725, the system can determine the attributes to be expressed to encountered user(s) according to the rules defined for the first user and the attributes determined for the encountered user(s). The expression of attributes for the avatar of the first user, as noted, defines the state of the avatar of the first user that is output. In step 730, the state of the avatar of the first user can be output. As noted, the state of the avatar will specify any attributes that are to be displayed, any attributes that have been added or modified through application of the attribute presentation rules. Any attributes that are to be suppressed will be excluded from the output state. Further, depending upon the attribute presentation rules and the attributes determined for each encountered avatar, the state of the avatar of the first user that is output to each encountered avatar may be different.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of controlling attribute expression for an avatar within a virtual environment, the method comprising:
   defining a rule that determines expression of an attribute of a first avatar conditioned upon an attribute of at least one other avatar within a virtual environment;
   identifying a plurality of avatars in contact with the first avatar within the virtual environment;
   determining a percentage of the plurality of avatars in contact with the first avatar that present a particular variation of the attribute of the first avatar;
   selecting, for presentation, between the attribute of the first avatar or the particular variation of the attribute based upon the rule and the percentage; and
   outputting a state of the first avatar comprising the selected attribute for presentation.

2. The computer-implemented method of claim 1, further comprising:
   detecting a missing attribute, wherein the missing attribute is an attribute presented by a second avatar that is not defined for the first avatar;
   selectively acquiring the missing attribute for the first avatar; and
   upon being acquired acquired, presenting the missing attribute for the first avatar.

3. A system comprising:
   a memory storing computer-usable program code that, when executed, controls attribute expression in association with an avatar within a virtual environment; and
   a processor executing the computer-usable program code, wherein the processor is configured to perform:

defining a rule that determines expression of an attribute of a first avatar conditioned upon an attribute of at least one other avatar within a virtual environment;

identifying a plurality of avatars in contact with the first avatar within the virtual environment;

determining a percentage of the plurality of avatars in contact with the first avatar that present a particular variation of the attribute of the first avatar;

selecting, for presentation, between the attribute of the first avatar or the particular variation of the attribute based upon the rule and the percentage; and outputting a state of the first avatar comprising the selected attribute for presentation.

4. The system of claim 3, wherein the processor is further configured to perform:

detecting a missing attribute, wherein the missing attribute is an attribute presented by a second avatar that is not defined for the first avatar;

selectively acquiring the missing attribute for the first avatar; and upon being acquired, presenting the missing attribute for the first avatar.

5. The system of claim 3, wherein the processor further:

determines a variation of the attribute of the second avatar; and selectively changes a variation of the attribute of the first avatar according to the variation of the attribute of the second avatar.

6. A computer program product comprising a computer-usable storage device having stored therein computer-usable program code that controls attribute expression in association with an avatar within a virtual environment, the computer-usable program code, which when executed by a computer hardware system, causes the computer hardware system to perform:

defining a rule that determines expression of an attribute of a first avatar conditioned upon an attribute of at least one other avatar within a virtual environment;

identifying a plurality of avatars in contact with the first avatar within the virtual environment;

determining a percentage of the plurality of avatars in contact with the first avatar that present a particular variation of the attribute of the first avatar;

selecting, for presentation, between the attribute of the first avatar or the particular variation of the attribute based upon the rule and the percentage; and outputting a state of the first avatar comprising the selected attribute for presentation, wherein the computer-usable storage device does not consist of a transitory, propagating signal.

7. The computer program product of claim 6, wherein the computer-usable program code further causes the computer hardware device to perform:

detecting a missing attribute, wherein the missing attribute is an attribute presented by a second avatar that is not defined for the first avatar;

selectively acquiring the missing attribute for the first avatar; and upon being acquired, presenting the missing attribute for the first avatar.

* * * * *